Patented Apr. 6, 1954

2,674,067

UNITED STATES PATENT OFFICE 2,674,067

PROCESS FOR SHAPING GLASS ARTICLES

Giulio Reggiani, Milan, Italy, assignor to Societe Anonyme des Manufactures des Glaces et Produits Chemiques de Saint-Gobain, Chauny & Cirey, Paris, France No Drawing. Application September 16, 1949, Serial No. 116,205

Claims priority, application Italy September 22, 1948

5 Claims. (Cl. 49—84)

This invention relates to a process for shaping glass articles.

There are well known processes for shaping a sheet of flat glass (which includes plate and sheet glass, the latter commonly called window glass), which consist in uniformly heating the sheet previously laid on a mold of refractory material until it begins to soften. The sheet conforms to the mold due to the effect of the heating. The temperature must be sufficiently raised in order that the sheet will conform exactly to the shape of the mold; but by so doing, there is a risk that should the glass get too soft, the surface of the sheet will be damaged by the contact with the mold, producing prints or marks. It is also possible to maintain a lower temperature and to assist the bending of the sheet by means of spatulas or other similar tools but under this working, there is some risk of marring the surface and obtaining an uneven and waved conformation.

Other processes are also known, which partially eliminate the above mentioned disadvantages. For example the sheet may be suspended in a vertical position by means of tongs or other suspension means and heated uniformly until the glass begins to soften, and shaping the sheet by applying pressure to its surface by means of two, male and female, pressure elements made of a suitable material. The temperature must be controlled so that the sheet will be easily conformed by the pressure of the forming elements but the sheet should be kept rigid enough so that it does not afterwards lose spontaneously the shape given to it when the forming elements are removed.

The working out of these processes is somewhat difficult when it is necessary to fashion articles of precise shape or of complex curvature and especially articles the surfaces of which are not developable.

Many theories have been conceived concerning the physical and chemical structure of glass, and without entering into digressions of a purely scientific character, there is no inconvenience in accepting the theory according to which the variation of the physical characteristics of the glass would be a consequence of its previous thermal treatment, which results in changes in the molecular arrangement and in the physicochemical structure of the substance. One of the fundamental characteristics of glass is its viscosity, which for a given glass, varies not only in relation with the temperature but also according to the various thermal treatments successively applied to the glass.

The success of the forming operation of a glass mass is largely dependent upon the value of the viscosity of said glass. It is consequently most important to have present the possibility of controlling this characteristic.

It is now well known, in glass technology, that when working glass in hot state, one has to avoid too quick deformations; when important deformations of the glass have to be obtained or in case of deformations producing strains in the material, they must be carried out in several steps by interposing appropriate thermal treatments. Failing to do so, thinner zones would appear and these zones when submitted to an uneven cooling, may cause the glass to break.

The degree and speed of the deformation to which glass may be submitted without any danger of rupture resulting from the hereabove mentioned causes depends upon the internal viscosity, which, in its turn is a function of the temperature. It would thus appear in last analysis that in orler to notably and quickly modify the shape of a glass article, and especially in order to give to a sheet a predetermined conformation, the only possible means would be to sufficiently increase the temperature of the article.

The present invention relates to another method of achieving the same result: it consists in submitting the glass to a previous altering of the viscosity before heating it incident to its shaping. The previous alteration of the viscosity may be caused by a thermal treatment and particularly by tempering the glass. As is well known, tempering consists in a heating of the glass above its annealing point immediately followed by its rapid chilling under its annealing point.

The temperature changes in a glass mass not only cause changes of its physical characteristics, but also in its internal structure.

For each temperature, there exists a particular molecular arrangement but the changes in this arrangement follow somewhat slowly the changes of the temperature, so that it is possible by sudden modification of the temperature, to keep approximately in the glass mass when cooled, the physicochemical structure it had when hot.

This phenomenon occurs in the tempering of glass: tempered glass when cooled shows physical characteristics different from those of the same glass annealed.

Also, viscosity has a lower value in tempered glass than it would have for a given temperature had the variation of temperature previously applied to the glass been sufficiently slow. If a tempered glass is afterwards reheated slowly enough, it becomes annealed and the value of its viscosity, among other characteristics, reaches again the value of the viscosity of the same glass annealed. But, if on the contrary, this tempered glass is quickly reheated, on account of the fact that the variations of its physical and chemical arrangement follow with a certain delay the variations of the temperature, it results that its viscosity will have a value lower than that corresponding to annealed glass at the various temperatures to which it is submitted.

From the above considerations, it results that, when two samples of the same glass are shaped under the same conditions, one of them having previously been annealed and the other tempered, the last one because of its lower viscosity will be shaped more easily and at a lower temperature than the annealed sample.

Of course, the more complicated the molds are on which the shaping is to be effected, such as a spherical mold, the more advantageous will be the use of the present invention. The ultimate conformation, according to the invention, may be obtained by means of successive partial operations, the special thermal treatments consisting in a sudden cooling of the heated article being repeated before each of the various phases of the conformation of the piece of glass.

Instead of submitting the whole glass mass to the previous altering treatment of the viscosity it may be advantageous to alter the viscosity of a portion only of the glass mass, the shape of the glass mass being subsequently modified.

The process according to the invention permits a shaping of hard glass articles by heating said articles to a lower temperature than would be necessary had said articles been previously annealed.

After the conformation or shaping treatment according to the invention, the sheet may be submitted to every convenient thermal treatment, as annealing or tempering.

While the method herein disclosed has been described in connection with the shaping of flat glass it is to be understood that it may be practiced also with the conformation or shaping of all glass articles.

What is claimed is:

1. In a method for shaping a glass mass a first step which consists in lowering the viscosity of the glass mass by a heating above its annealing point immediately followed by a rapid chilling and afterwards a second step which comprises reheating the glass mass at a rapid rate to its softening point and shaping the glass mass so heated to the desired form.

2. In a method for bending a glass sheet, a first step which consists in lowering its viscosity by a heating above its annealing point immediately followed by a rapid chilling and afterwards a second step which comprises reheating the sheet at a rapid rate to its softening point and bending the sheet so heated to the desired form.

3. In a method for bending a glass sheet, a first step which consists in lowering its viscosity by a heating above its annealing point followed by a rapid chilling and afterwards a second step which consists in submitting the sheet to repeated cycles, each of them including reheating the sheet at a rapid rate to its softening point, its partial bending followed by a rapid chilling, and to a final cycle including reheating the sheet at a rapid rate to its new softening point, finally bending the sheet so heated to the desired curvature and thereafter annealing the bent sheet.

4. The improved method of bending a glass sheet which consists in lowering its viscosity by a heating above its annealing point followed by a rapid chilling and afterwards submitting the sheet to repeated cycles, each of them including reheating the sheet at a rapid rate to its softening point, bending and rapidly chilling the heated and bent sheet.

5. The improved method of modifying the shape of a glass article which consists in a heating of the article above its annealing temperature followed by a rapid chilling of a portion of said article and afterwards reheating at a rapid rate said portion of the article up to its softening point of said portion obtained by the above treatment and then shaping the article so reheated to its definitive curvature.

References Cited in the file of this patent

UNITED STATES PATENTS

| Number | Name | Date |
| --- | --- | --- |
| 1,301,714 | Kueppers | Apr. 22, 1919 |
| 2,233,435 | Snow | Mar. 4, 1941 |
| 2,250,623 | Forbes | July 29, 1941 |
| 2,348,279 | Boyles et al. | May 9, 1944 |
| 2,377,849 | Binkert et al. | June 12, 1945 |

FOREIGN PATENTS

| Number | Country | Date |
| --- | --- | --- |
| 111,753 | Australia | Oct. 16, 1940 |
| 620,535 | Great Britain | Mar. 25, 1949 |